United States Patent
Zwerger

(10) Patent No.: US 10,809,204 B2
(45) Date of Patent: Oct. 20, 2020

(54) INSPECTION AND/OR WEB OBSERVATION APPARATUS, USE OF AN ARRANGEMENT AS A BACKGROUND PANEL OR TRANSMITTED-LIGHT TRANSMITTER IN THE INSPECTION AND/OR WEB OBSERVATION APPARATUS, AND METHOD FOR OPERATING THE INSPECTION AND/OR WEB OBSERVATION

(71) Applicant: Texmag GmbH Vertriebsgesellschaft, Thalwil (CH)

(72) Inventor: Lars Zwerger, Augsburg (DE)

(73) Assignee: Texmag GmbH Vertriebsgesellschaft, Thalwill (CH)

( * ) Notice: Subject to any disclaimer, the term of this patent is extended or adjusted under 35 U.S.C. 154(b) by 517 days.

(21) Appl. No.: 15/438,324

(22) Filed: Feb. 21, 2017

(65) Prior Publication Data

US 2017/0241915 A1 Aug. 24, 2017

(30) Foreign Application Priority Data

Feb. 22, 2016 (DE) ........................ 10 2016 103 070

(51) Int. Cl.
*G01N 21/89* (2006.01)
*G01B 11/04* (2006.01)
(Continued)

(52) U.S. Cl.
CPC ....... *G01N 21/8901* (2013.01); *G01B 11/046* (2013.01); *G06T 7/0004* (2013.01);
(Continued)

(58) Field of Classification Search
None
See application file for complete search history.

(56) References Cited

U.S. PATENT DOCUMENTS 5,243,402 A * 9/1993 Weber ................ G01N 21/8901
250/559.15
6,124,971 A * 9/2000 Ouderkirk ............... B32B 27/36
359/485.03
(Continued)

FOREIGN PATENT DOCUMENTS

CN 1403857 A 3/2003
CN 101534389 A 9/2009
(Continued)

OTHER PUBLICATIONS

Written opinion dated Apr. 25, 2017 of European counterpart application No. EP 17155997 and English language machine translation thereof.
(Continued)

*Primary Examiner* — Gelek W Topgyal
(74) *Attorney, Agent, or Firm* — Falk Ewers; Ewers IP Law PLLC

(57) ABSTRACT

An apparatus for inspecting or observing a material web, a process of inspecting the material web and a method for operating the apparatus for inspecting or observing the material web are provided. The apparatus has a guiding device through which the material web is guided and a camera including a field of view and configured to record an image of the front side within the field of view. An incident light transmitter is configured to illuminate the front side with incident light, and a background panel is arranged on the rear side of the material web within the field of view. The background panel includes a diffuser plate, a light guide plate, a reflecting surface, and a light source configured to couple light into the light guide plate which is configured to uncouple the light to illuminate the rear side of the material web with transmitted light.

20 Claims, 2 Drawing Sheets

(51) Int. Cl.
*G06T 7/00* (2017.01)
*H04N 5/225* (2006.01)
*H04N 7/18* (2006.01)

(52) U.S. Cl.
CPC ........... *H04N 5/2256* (2013.01); *H04N 7/183* (2013.01); *G01N 2021/8908* (2013.01); *G06T 2207/30164* (2013.01)

(56) References Cited

U.S. PATENT DOCUMENTS

| | | | | |
|---|---|---|---|---|
| 6,232,617 | B1* | 5/2001 | Vanhee | G01N 21/8901 250/559.4 |
| 9,250,062 | B2* | 2/2016 | Doerband | G01N 21/94 |
| 9,488,863 | B2 | 11/2016 | Overes et al. | |
| 9,927,369 | B2* | 3/2018 | Sprague | G01N 21/8806 |
| 2003/0090607 | A1* | 5/2003 | Kamijo | G02F 1/133555 349/96 |
| 2004/0105251 | A1* | 6/2004 | Yu | G02B 6/0056 362/620 |
| 2009/0079909 | A1* | 3/2009 | Ouderkirk | B29C 55/023 349/67 |
| 2009/0206243 | A1* | 8/2009 | Eisen | G06K 9/036 250/227.11 |
| 2009/0303468 | A1* | 12/2009 | Itoh | G01B 11/306 356/237.2 |
| 2011/0051396 | A1* | 3/2011 | Liao | G02B 3/005 362/97.1 |
| 2011/0181873 | A1* | 7/2011 | Yavets-Chen | G01N 21/55 356/237.2 |
| 2016/0041090 | A1* | 2/2016 | Kimura | G01N 21/359 427/553 |

FOREIGN PATENT DOCUMENTS

| | | | |
|---|---|---|---|
| CN | 104115056 A | 10/2014 | |
| EP | 1930718 A1 | 6/2008 | |
| EP | 1940141 A1 * | 7/2008 | ......... G01N 21/8901 |
| EP | 1940141 A1 | 7/2008 | |
| EP | 2687837 A1 * | 1/2014 | ......... G01N 21/8901 |

OTHER PUBLICATIONS

Search Report issued in German Patent Application No. DE 10 2016 103 070.8 (from which this application claims priority), dated Nov. 10, 2017 and English language machine translation thereof.
Product data sheet Fa. Stemmer Imaging: Fiat Lights—LFL Series, retrieved on Nov. 4, 2016 under http: //www.stemmer-imaging.delmedia/up/oadslwebsites/documents/products/illumination/CCS/en-CCS-LFL-Flat-Lights-BCCSB-201306.pdf.
Imaging Stemmer: "Flat Lights—LFL Series," Jun. 30, 2013, downloaded on Apr. 4, 2017, URL: https://www.stemmer-imaging.co.uk/media/uploads/websites/documents/products/illumination/CSS/en-CSS/LFL-Flat-Lights-BCCS8-201306.pdf.
Edmund Optics: "Mattglas," Apr. 21, 2017, downloaded on Apr. 21, 2017, URL: https://www.edmundoptics.de/optics/windows-diffusers/optical-diffusers/ground-glass-diffusers/#resources with English language Abstract downloaded on May 22, 2017, URL: https://www.edmundoptics.com/optics/windows-diffusers/optical-diffusers/ground-glass-diffusers/?site=EN&countryid=232&_ga=2.116150351.877755647.1495471469-1999575761.1495471430#resources.
European Search Report dated Apr. 25, 2017 of European counterpart application No. EP 17155997.
Office Action issued in co-pending Chinese Patent Application No. 2017100095815.6, dated Sep. 25, 2019 and English language translation thereof.

* cited by examiner

INSPECTION AND/OR WEB OBSERVATION APPARATUS, USE OF AN ARRANGEMENT AS A BACKGROUND PANEL OR TRANSMITTED-LIGHT TRANSMITTER IN THE INSPECTION AND/OR WEB OBSERVATION APPARATUS, AND METHOD FOR OPERATING THE INSPECTION AND/OR WEB OBSERVATION

CROSS REFERENCE TO RELATED APPLICATIONS

This application is claiming priority from German application 10 2016 103 070.8, filed Feb. 22, 2016, and the entire content of the application is incorporated herein by reference.

FIELD OF THE INVENTION

The invention relates to an inspection apparatus and/or web observation apparatus, the use of an arrangement as a background panel or transmitted-light transmitter in the inspection apparatus and/or web observation apparatus, and a method for operating the inspection apparatus and/or web observation apparatus.

BACKGROUND OF THE INVENTION

Conventionally, in a plant for producing, processing and finishing of a material web, such as a paper web, a film web or a textile web, production, processing or finishing of the material web can be monitored using a camera. This may include, in order to increase the image quality of the images recorded by the camera, illuminating the material web with incident light from the same side on which the camera is also arranged. To create an improved background and thus to improve the image quality, a mounted background panel can be provided on the side of the material web opposite of the camera. The term "background panel" is to be understood in the sense of a screening device and not in the optical sense, i.e. in the sense of a plate having a hole.

In the case of a partially mixed impermeable and/or opaque, translucent, transparent material web, the incident light can create a shadow from the impermeable and/or opaque, translucent areas of the material web, which is visible on the background panel. This visible shadow, which is then also recorded by the camera, diminishes the image quality. On the other hand, the background panel then also has areas which are substantially brighter than the shaded areas. These much brighter areas can appear as an overexposure on the images, which also diminishes the image quality.

The shadow and the overexposure can be reduced by arranging the background panel at a large distance from the material web. This is, however, only possible if there is sufficient space in the plant for producing, processing or finishing the material web. Furthermore, it can additionally be disadvantageous that with a large distance, the light source or the light sources of the incident light become visible in the images. This also diminishes the image quality of the images recorded by the camera.

SUMMARY OF THE INVENTION

It is an object of the invention to provide an inspection apparatus and/or a web observation apparatus for a material web, a use of an arrangement as a background panel and a method for operating the inspection apparatus and/or the web observation apparatus in which images of the material web are recordable with a high image quality.

Accordingly, an apparatus for inspecting or observing a material web is provided, the material web having a front side and a rear side, the rear side facing away from the front side, the apparatus including: a guiding device configured to guide the material web through the apparatus; a camera having a field of view and being configured to record an image of an area of the front side that is within the field of view; an incident light transmitter configured to illuminate the front side of the material web in an area of the field of view with a first light, wherein the first light is incident light; a background panel including a diffuser plate, a light guide plate, a reflecting surface, and at least one light source configured to couple a second light into at least one end of the light guide plate, wherein the background panel is arranged on the rear side of the material web opposite to the camera and within the field of view of the camera, wherein the diffuser plate is arranged between the material web and the light guide plate and has an absorption for the incident light of 5% to 50%, wherein the light guide plate is arranged between the diffuser plate and the reflecting surface and is configured to uncouple the second light to illuminate the rear side of the material web with the second light, and wherein the second light is transmitted light.

In addition, a process of inspecting or observing a material web is provided, the process including: providing a diffuser plate, a light guide plate, at least one light source, a reflecting surface, and at least one of a background panel and an active transmitted light transmitter in an apparatus; the apparatus including: a guiding device configured to guide through the material web; a camera having a field of view and being configured to record an image of an area of the front side that is within the field of view; an incident light transmitter configured to illuminate the front side of the material web in an area of the field of view with a first light, wherein the first light is incident light; a background panel including a diffuser plate, a light guide plate, a reflecting surface, and at least one light source configured to couple a second light into at least one end of said light guide plate, wherein the background panel is arranged on the rear side of the material web opposite to the camera and within the field of view of the camera, wherein the diffuser plate is arranged between the material web and the light guide plate and has an absorption for the incident light of 5% to 50%, wherein the light guide plate is arranged between the diffuser plate and the reflecting surface and is configured to uncouple the second light to illuminate the rear side of the material web with the second light, and wherein the second light is transmitted light.

The inventive inspection apparatus and/or web observation apparatus for inspecting or observing, respectively, of a material web, having a front side and a rear side arranged facing away from the front side, guided through a guiding device, includes a camera which has a field of view and which is configured to record an image of the front side within the field of view, an incident-light transmitter configured to illuminate the front side in an area of the field of view with an incident light, and a background panel arranged on the side of the material web opposite to the camera and within the field of view of the camera, wherein the background panel includes a diffuser plate having an absorption for the incident light of 5 to 50%, a light guide plate and a reflecting surface, which are arranged in this order starting from the material web, and the background panel includes a light source configured to couple light into one end of the light guide plate, wherein the light guide plate is configured to uncouple the light so that the rear side of the material web can also be illuminated with transmitted light, i.e., with light that passes through a transparent medium.

The invention provides for the use of an arrangement with a diffuser plate, a light guide plate, a light source and a reflecting surface as a background panel or as an active transmitted-light transmitter in the inspection apparatus and/or the web observation apparatus, the diffuser plate having an absorption for the incident light of 5 to 50%, in particular of 10 to 30%.

According to an aspect of the inventive method for operating the inspection apparatus and/or the web observation apparatus, an image is recorded with the camera.

The background panel can therefore be operated passively and actively. Passive operation is characterized in that the light source is switched off so that the rear side of the material web is not illuminated with the transmitted light. Active operation is characterized in that the light source is switched on and the background panel then functions as a transmitted-light transmitter so that the rear side of the material web is illuminated with the transmitted light. In principle, both during active and passive operation of the background panel, the material web is illuminated with the incident light, but all possible illumination combinations can be used. The incident light may flash or provide a sustained illumination. With the background panel, the operator of the inspection apparatus and/or web observation apparatus is provided with a tool which allows trying the active or passive operation for improving the image quality of the images recorded with the inspection apparatus and/or web observation apparatus.

During the passive operation as well as the active operation, with the background panel designed according to an aspect of the invention, only a very weak shadow and only a very weak overexposure can be formed, or the formation of the shadow and/or the overexposure can be completely avoided, so that images can be recorded with a high image quality, in particular with a high contrast. With an absorption of at least 5% for the incident light, reflections of the incident light on the background panel and thus overexposure can be avoided in a particularly effective manner. This deliberately takes into account that with the relatively high minimum absorption, a relatively high proportion of the transmitted light is absorbed in the diffuser plate and is thus not available for illuminating the material web. This further deliberately takes into account that with the relatively high minimum absorption, the diffuser plate is heated by the absorption of the transmitted light and/or the incident light during operation of the inspection apparatus and/or web observation apparatus.

The weak shadow and the weak overexposure are formed even when the background panel is arranged in proximity to the material web. Thus, the inspection apparatus and/or the web observation apparatus only have a small footprint. In addition, the incident-light transmitter producing the incident light, in particular the at least one light source of the incident-light transmitter, is not visible in the recorded images. On the one hand, this is achieved by the inventive design of the background panel, on the other hand this effect can be further heightened by arranging the background panel proximate to the material web.

The active operation can be advantageous for different material webs. For example, by active operation the contrast of the images and thus their image quality can be increased. An application is also conceivable, for example, which compares the front side and the rear side of the material web with one another, such as, e.g., in the production, processing or finishing of banknotes. For example, an inspection may be carried out on the front side register and the rear side register of the material web. On the basis of this examination, for example, the printing faces of the front side and of the rear side of the material web can be precisely aligned. In the process, by active operation, the contrast of the rear side can be increased or the rear side can be made visible in the first place in the images recorded by the camera.

With the light guide plate and its arrangement in the background panel, a particularly homogeneous illumination of the material is achievable. The light guide plate may, for example, include glass or polycarbonate. On the light guide plate, in particular on its surface, white points can be provided to uncouple the light. Particles may also be provided in the light guide plate to uncouple the light. In this case, the size of the particles can vary to compensate for the light attenuation originating from the light source so that the intensity of the emerging light is as homogenous as possible. Also, the light guide plate may have a structured surface to uncouple the light. The light uncoupling thus takes place in the direction of the diffuser plate and/or the reflecting surface.

The diffuser plate can be, for example, a frosted glass sheet, an acrylic glass sheet and/or plexiglass in frosted glass optics, in particular polymethyl methacrylate (PMMA).

The reflecting surface can be diffusely reflective. In this case, the diffusely reflective reflecting surface can be, for example, a white lacquered sheet metal or a diffuser foil. With the diffusely reflective reflecting surface, a particularly homogeneous illumination of the rear side can be achieved with the transmitted light.

According to an aspect of the invention, a plurality of light sources is arranged along the end of the light guide plate which can be switched on individually so that the rear side of the material web can be illuminated with the transmitted light in some parts. Individual areas of the material web can thereby be selectively illuminated without requiring illumination of the entire material web. As a result, the energy consumption of the inspection apparatus and/or web observation apparatus is advantageously low. In this case, the background panel is then configured in such a way that the entire material web can be illuminated in its transverse direction.

Alternatively, according to another aspect of the invention, the background panel is displaceably arranged in the transverse direction of the material web. This allows individual areas of the material web to also be selectively illuminated, and, at the same time, the width of the background panel can be selected to be shorter than the width of the material web, whereby the background panel can advantageously be made small and with little material consumption. For the displaceable background panel, a light source or a plurality of light sources can also be provided.

The light sources of the background panel are preferably configured to emit in the ultraviolet and/or in the visible and/or in the infrared wavelength range, whereby an RGB exposure is particularly provided in the visible range.

The light sources of the background panel are preferably configured to emit continuous light and/or flashed light.

The inspection apparatus and/or web observation apparatus is preferably configured to vary the intensity of the light sources of the background panel. This permits adjusting the intensity of the transmitted light to the optical properties of the material web.

According to yet another aspect of the invention, the diffuser plate, the light guide plate and the reflecting surface are spaced apart and arranged essentially parallel to each other. With the spaced-apart arrangement, the transmitted light can be uncoupled from the light guide plate with a high efficiency. With the parallel arrangement, the formation of the shadows and the overexposure can be particularly well suppressed.

According to an aspect of the invention, the light guide plate is transparent for incident light in a direction perpendicular to the light guide plate. As a result, light hitting the reflecting surface and being reflected by it is guided back to the material web via the light guide plate. This advantageously increases the efficiency of the illumination of the rear side with the transmitted light.

The diffuser plate preferably has an absorption for the incident light of 10 to 30%. With the mentioned measures, the formation of the shadows and the overexposure is particularly well suppressed.

The diffuser plate is preferably arranged essentially parallel to the material web. With the mentioned measures, the formation of the shadows and the overexposure is particularly well suppressed.

According to another aspect of the invention, when the arrangement with the diffuser plate, the light guide plate, the light source and the reflecting surface is used, the front side is illuminated with the incident light and the rear side is illuminated with the transmitted light, or the front side is illuminated with the incident light and the rear side is not illuminated with the transmitted light, or the front side is not illuminated with the incident light and the rear side is illuminated with the transmitted light, or the front light is not illuminated with the incident light and the rear side is not illuminated with the transmitted light. According to an aspect of the invention, the front side is illuminated with the incident light and, optionally, the rear side is illuminated with the transmitted light.

The material web is preferably at least in some parts transparent and/or at least in some parts translucent for the incident light and/or the transmitted light.

According to an aspect of the invention, the material web is in some parts impermeable and/or opaque for the incident light and/or the transmitted light.

According to an aspect of the invention, the front side of the material web is illuminated with incident light. With material webs which are both transparent and/or translucent as well as impermeable and/or opaque, the problems of the formation of the shadows and overexposure occur particularly strongly, whereby with such material webs, the use of the arrangement is particularly advantageous.

According to a further aspect of the invention, a method for operating the inspection apparatus and/or web observation apparatus is provided in which the front side is illuminated with the incident light and the rear side is illuminated with the transmitted light, or the front side is illuminated with the incident light and the rear side is not illuminated with the transmitted light, or the front side is not illuminated with the incident light and the rear side is illuminated with the transmitted light, or the front light is not illuminated with the incident light and the rear side is not illuminated with the transmitted light.

According to another aspect of the invention, a method for operating the inspection apparatus and/or web observation apparatus is provided in which the rear side of the material web is illuminated with transmitted light. The image quality can then be further increased, for example, an improved rendering of colors can be achieved, the color cast can be reduced and/or the contrast can be increased.

The rear side is preferably illuminated concurrently with the front side of the material web. The image quality can then be further increased, for example, an improved rendering of colors can be achieved, the color cast can be reduced and/or the contrast can be increased.

Using illumination with the transmitted light, the front side register can be compared with the rear side register of the material web.

According to yet another aspect of the invention, the material web is at least in some parts transparent and/or at least in some parts translucent for the incident light and/or the transmitted light.

The material web is preferably in some parts impermeable and/or opaque for the incident light and/or transmitted light.

With material webs which are both transparent and/or translucent as well as impermeable and/or opaque, the problems of the formation of the shadows and overexposure occur particularly strongly, whereby, with such material webs, the method for operating the inspection apparatus and/or web observation apparatus is particularly advantageous.

The illumination by the incident-light transmitter is a direct illumination or a diffuse illumination. The illumination by the incident-light transmitter is a linearly polarized illumination. The illumination by the incident-light transmitter is a focused and/or collimated illumination. The illumination by the incident-light transmitter is a bright-field illumination and/or dark-field illumination. The incident-light transmitter is configured to emit monochrome radiation, polychrome radiation and/or an adjustable spectrum, in particular adjustable by an RGB illumination. The incident-light transmitter has incandescent lamps, gas-discharge lamps, LEDs, in particular OLEDs and/or AMOLEDs, and/or lasers. The incident-light transmitter is configured to perform a line illumination or a surface illumination. The incident-light transmitter is modular and/or adjustable to the width of the material web. According to an aspect of the invention, the incident-light transmitter is fixed relative to the material web or displaceable in the direction of the material web width. The incident-light transmitter is configured such that an illumination angle, with which the radiation hits the material web, is selected as a function of the material of the material web.

The light source is configured to emit monochrome radiation, polychrome radiation and/or an adjustable spectrum, in particular adjustable by an RGB illumination. The light source has incandescent lamps, gas-discharge lamps, LEDs, in particular OLEDs and/or AMOLEDs, and/or lasers.

The camera is a line camera or a camera with a two-dimensional matrix of photoelements. The camera is a multi-channel camera with multiple channels for different wavelength ranges. The camera is a black-and-white camera or a color camera. The camera is configured to use a region of interest. The camera is a CCD camera or a CMOS camera. According to an aspect of the invention, the inspection apparatus and/or the web observation apparatus has a plurality of cameras, the focus areas of which are arranged overlappingly or adjacently. According to another aspect of the invention, the inspection apparatus and/or the web observation apparatus has an additional detail camera which is configured to record a section of the focus area with a higher local resolution. The camera is configured to record one-dimensional, two-dimensional or three-dimensional images. The camera has a zoom lens or a fixed-focus lens. According to yet another aspect of the invention, the camera is fixed relative to the material web or displaceable in the direction of the material web width.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
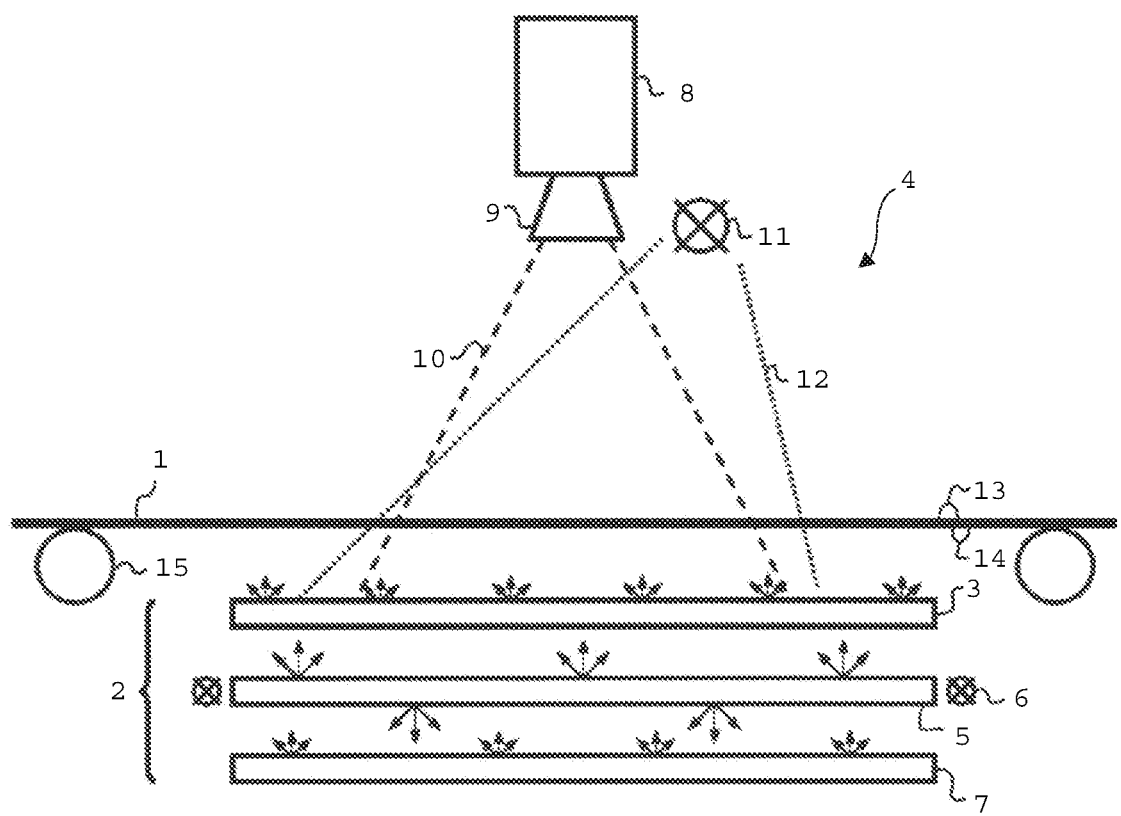
FIG. 1 shows an inspection apparatus and/or web observation apparatus with a material web and with an illumination with transmitted light according to an exemplary embodiment of the invention.
Figure 2:
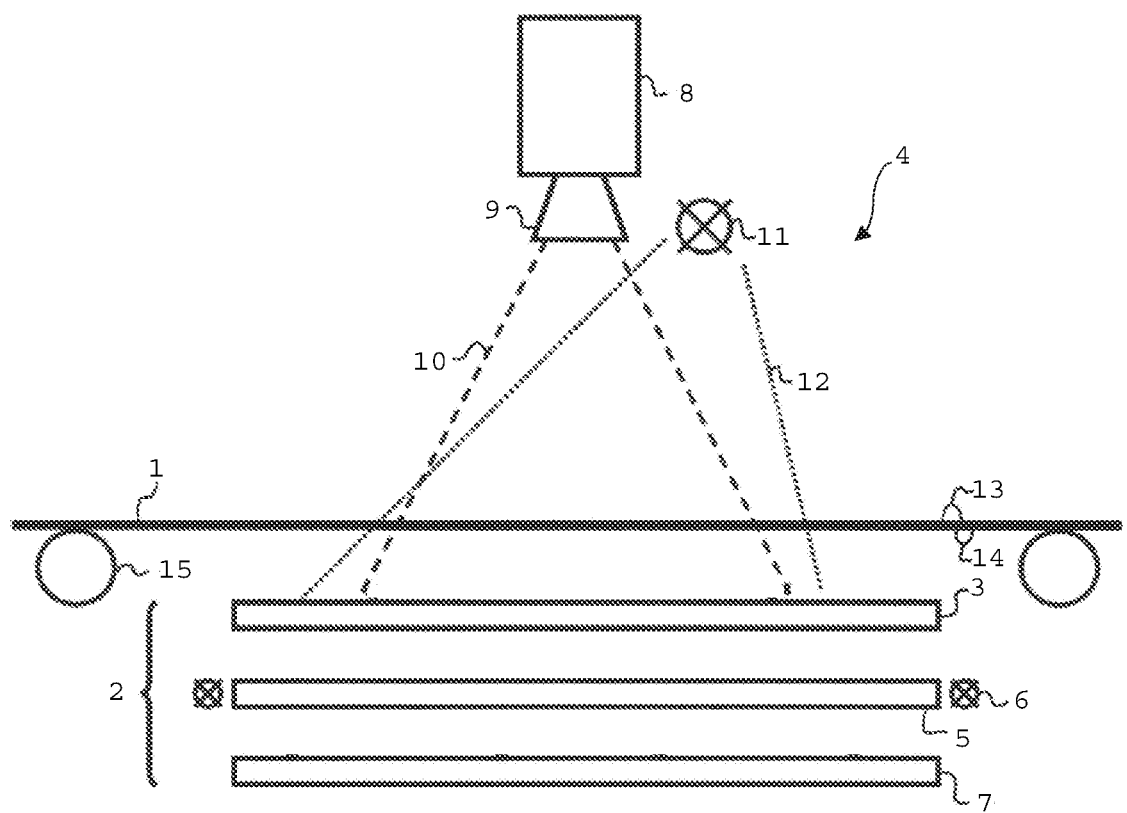
FIG. 2 shows the apparatus of FIG. 1 without illumination with the transmitted light.

FIGS. 1 and 2 show an inspection apparatus and/or web observation apparatus 4 which can be arranged, for example, in a plant for producing, processing or finishing a material web 1. The inspection apparatus and/or web observation apparatus 4 is configured to perform an inspection or observation of the material web 1. The material web 1 has a front side 13 and a rear side 14 which is arranged facing away from the front side 13. The material web 1 is guided by a guiding device 15 and moves in a direction of travel during operation of the plant.

The material web 1 is at least in some parts transparent and/or at least in some parts translucent for the incident light and/or the transmitted light. In addition, the material web 1 is in some parts impermeable and/or opaque for the incident light and/or the transmitted light.

The inspection apparatus and/or web observation apparatus 4 includes a camera 8, an incident-light transmitter 11 and a background panel 2. The camera 8 includes an imaging optics 9 which is configured to image a field of view 10 on the camera 8. In addition, the imaging optics 9 produces a sharp image of the front side 13. At least one part of the material web 1 is guided through the field of view 10, whereby the front side 13 of the material web 1 is arranged facing the camera 8. The camera 8 is configured to record an image of the front side 13 of the material web 1 in the field of view 10.

The incident-light transmitter 11 has an illumination area 12 which is the spatial region illuminatable with an incident light by the incident-light transmitter 11. The illumination area 12 is arranged such that the front side 13 of the material web 1 can be illuminated with the incident light in a region of the field of view 10. As shown in FIGS. 1 and 2, the entire front side 13 of the material web 1 located in the field of view 10 is arranged within the illumination region 12. The camera 8 and the incident-light transmitter 11 are thereby controlled such that the recording of the image and the illumination of the front side 13 take place concurrently so that an image of the front side 13 illuminated with the incident light is recordable with the camera 8.

The background panel 2 is arranged on the side of the material web 1 opposite of the camera 8 and in the field of view 10 of the camera 8 so that the rear side 14 of the material web 1 is arranged facing the background panel 2. As shown in FIGS. 1 and 2, the background panel 2 extends over the entire field of view 10 of the camera 8, whereby it is also conceivable that the background panel 2 extends only over a portion of the field of view 10 of the camera 8.

The background panel 2 has a diffuser plate 3, a light guide plate 5 and a reflecting surface 7 which may be diffusely reflective, being arranged in this order starting from the material web 1. The diffuser plate 3 has an absorption for the incident light of 5 to 50%, in particular of 10 to 30%. In this case, the absorption is determined with light incident perpendicular to the diffuser plate, i.e. the light in FIGS. 1 and 2 propagating vertically. The diffuser plate 3 can, for example, be a frosted glass sheet, an acrylic glass sheet and/or plexiglass in frosted glass optics, in particular PMMA. The diffusely reflective reflecting surface 7 can be, for example, a white lacquered sheet metal or a diffuser foil. The light guide plate 5 can, for example, be made of glass or polycarbonate, whereby the light guide plate may have white points or particles or may be structured to uncouple the light. The diffuser plate 3, the light guide plate 5 and the reflecting surface 7 are arranged spaced apart from each other so that an air gap is formed between the diffuser plate 3 and the light guide plate 5 as well as between the light guide plate 5 and the reflecting surface 7. The diffuser plate 3, the light guide plate 5 and the reflecting surface 7 are arranged essentially parallel to one another and essentially parallel to the material web 1.

The background panel 2 has a light source 6 configured to couple light into one end of the light guide plate 5, wherein the light guide plate 5 is configured to uncouple the light coupled by the light source 6 at two opposite sides of the light guide plate 5. As a result, the rear side 14 of the material web 1 is also illuminatable with a transmitted light in an area of the field of view. In this case, the transmitted light emerging from the side of the light guide plate 5 facing the material web 1 penetrates the diffuser plate 3 and subsequently hits the material web 1. Transmitted light emerging from the side of the light guide plate 5 facing away from the material web 1 is reflected on the reflecting surface 7, penetrates the light guide plate 5 and the diffuser plate 3 and subsequently hits the rear side 14 of the material web 1. The light source 6, the camera 8, and the incident-light transmitter 11 are thereby controlled such that the recording of the image with the camera 8 can be performed concurrently with the illumination with the incident light and the transmitted light.

It is in principle conceivable that the front side 13 is illuminated with the incident light and the rear side 14 is illuminated with the transmitted light, or the front side 13 is illuminated with the incident light and the rear side 14 is not illuminated with the transmitted light, or the front side 13 is not illuminated with the incident light and the rear side 14 is illuminated with the transmitted light, or the front side 13 is not illuminated with the incident light and the rear side 14 is not illuminated with the transmitted light.

It is conceivable that a plurality of the light sources 6 arranged along the end of the light guide plate 5 is provided which can be switched on individually so that the rear side 14 of the material web 1 can be illuminated with the transmitted light in some parts. Alternatively, it is conceivable that the background panel 2 is displaceably arranged in the transverse direction of the material web 1. In other words, this means that the background panel 1 is perpendicular to the direction of travel of the material web 1 and displaceable in parallel to the material web 1. For the displaceable background panel, a light source or also a plurality of light sources can be provided.

The light sources are configured to emit in the ultraviolet and/or in the visible and/or in the infrared wavelength range, whereby in principle all combinations of wavelength ranges are conceivable, whereby an RGB exposure is particularly provided in the visible range. The light sources are configured to emit continuous light and/or flashed light. The light guide plate 5 is transparent for incident light perpendicular to the light guide plate 5. The diffuser plate 3 has an absorption for the incident light of 5 to 50%, in particular of 10 to 30%.

FIG. 1 shows the case when the at least one light source 6 is switched on, and FIG. 2 shows the case when the at least one light source 6 is switched off. FIG. 1 thus shows the active operation in which the background panel 2 functions both as the background panel 2 as well as a transmitted-light transmitter 2. FIG. 2, by contrast, shows the passive operation in which the background panel 2 functions only as the background panel 2.

By way of example, the method for operating the inspection apparatus and/or web observation apparatus 4 is to be performed as follows: In both the active operation and the passive operation of the background panel 2, the front side 13 of the material web 1 is illuminated with the incident light and, concurrently, an image is recorded with the camera 8. In the passive operation of the background panel 2, the at least one light source 6 is switched off, whereas in the active operation of the background panel 2, the rear side 14 of the material web 1 is illuminated concurrently with the front side 13 of the material web 1 with the transmitted light.

It is understood that the foregoing description is that of the example embodiments of the invention and that various changes and modifications may be made thereto without departing from the spirit and scope of the invention as defined in the appended claims.

LIST OF REFERENCE NUMERALS 1 material web
2 background panel or transmitted-light transmitter
3 diffuser plate
4 inspection apparatus and/or web observation apparatus
5 light guide plate
6 light source/light sources
7 reflecting surface
8 camera
9 imaging optics
10 field of view
11 incident-light transmitter
12 illumination area
13 front side
14 rear side
15 guiding device

What is claimed is:

1. An apparatus for inspecting or observing a material web, the material web having a front side and a rear side, the rear side facing away from the front side, the apparatus comprising:
   a guiding device configured to guide the material web through the apparatus;
   a camera having a field of view and being configured to record an image of an area of the front side that is within the field of view;
   an incident light transmitter configured to illuminate the front side of the material web in an area of the field of view with a first light, wherein the first light is incident light;
   a background panel including a diffuser plate, a light guide plate, a reflecting surface, and at least one light source configured to couple a second light into at least one end of the light guide plate, wherein the background panel is arranged on the rear side of the material web opposite to the camera and within the field of view of the camera,
   wherein the diffuser plate is arranged between the material web and the light guide plate and has an absorption of 5% to 50% for the incident light passing through the material web,
   wherein the light guide plate is arranged between the diffuser plate and the reflecting surface and is configured to uncouple the second light to illuminate the rear side of the material web with the second light,
   wherein the second light is transmitted light,
   wherein the material web is made of a material,
   wherein the incident light transmitter is arranged at an angle relative to the material web such that the first light hits the material web at the angle, and
   wherein the angle is selected as a function of the material.

2. The apparatus of claim 1, wherein the apparatus is an inspection apparatus.

3. The apparatus of claim 1, wherein the apparatus is a web observation apparatus.

4. The apparatus of claim 1, further comprising:
   at least two light sources arranged along the at least one end of the light guide plate; and,
   wherein each of the at least two light sources are configured to be switched on individually to partially illuminate the rear side of the material web with the transmitted light.

5. The apparatus of claim 1, wherein the background panel is arranged to be displaceable in a direction transverse to the material web.

6. The apparatus of claim 1, wherein:
   the at least one light source is configured to emit the transmitted light in at least one of an ultraviolet wavelength range, a visible wavelength range, and an infrared wavelength range, and
   in the visible range, an RGB exposure is provided.

7. The apparatus of claim 1, wherein the at least one light source is configured to emit at least one of continuous light and flashed light.

8. The apparatus of claim 1, wherein:
   the diffuser plate, the light guide plate and the reflecting surface are spaced apart from each another, and
   the diffuser plate, the light guide plate and the reflecting surface are arranged substantially parallel to each other.

9. The apparatus of claim 1, wherein the light guide plate is transparent for incident light entering perpendicular to the light guide plate.

10. The apparatus of claim 1, wherein the diffuser plate has an absorption for the incident light of 10% to 30%.

11. The apparatus of claim 1, wherein the diffuser plate is arranged essentially parallel to the material web.

12. A process of inspecting or observing a material web, the process comprising:
   providing a diffuser plate, a light guide plate, at least one light source, a reflecting surface, and at least one of a background panel and an active transmitted light transmitter in an apparatus; the apparatus comprising:
   a guiding device configured to guide through the material web;
   a camera having a field of view and being configured to record an image of an area of the front side that is within the field of view;
   an incident light transmitter configured to illuminate the front side of the material web in an area of the field of view with a first light, wherein the first light is incident light;
   a background panel including a diffuser plate, a light guide plate, a reflecting surface, and at least one light source configured to couple a second light into at least one end of said light guide plate, wherein the background panel is arranged on the rear side of the material web opposite to the camera and within the field of view of the camera, wherein the diffuser plate is arranged between the material web and the light guide plate and has an absorption of 5% to 50% for the incident light passing through the material web, wherein the light guide plate is arranged between the diffuser plate and the reflecting surface and is configured to uncouple the second light to illuminate the rear side of the material web with the second light, wherein the second light is transmitted light, wherein the material web is made of a material, wherein the incident light transmitter is arranged at an angle relative to the material web such that the first light hits the material web at the angle, and wherein the angle is selected as a function of the material.

13. The process of claim 12, wherein the diffuser plate has an absorption for the incident light of 10% to 30%.

14. The process of claim 12, further comprising:
inspecting or observing the material web by at least one of:
illuminating the front side of the material web with the incident light and the rear side of the material web with the transmitted light;
illuminating the front side of the material web with the incident light without illuminating the rear side of the material web with the transmitted light;
illuminating the rear side of the material web with the transmitted light without illuminating the front side of the material web with the incident light; and,
inspecting the material web without illuminating the front side of the material web with the incident light and without illuminating the rear side of the material web with the transmitted light.

15. The process of claim 12, wherein at least some parts of the material web are at least one of:
transparent for the incident light;
transparent for the transmitted light;
translucent for the incident light; and,
translucent for the transmitted light.

16. The process of claim 15, wherein at least some parts of the material web are at least one of:
impermeable for the incident light;
impermeable for the transmitted light;
opaque for the incident light; and,
opaque for the transmitted light.

17. A method for operating an apparatus for inspecting or observing a material web as claimed in claim 1, the method comprising:
recording the image with said camera.

18. The method of claim 17, further comprising:
inspecting or observing the material web by at least one of:
illuminating, concurrently with the recording of the image, the front side of the material web with the incident light and the rear side of the material web with the transmitted light;
illuminating, concurrently with the recording of the image, the front side of the material web with the incident light without illuminating the rear side of the material web with the transmitted light;
illuminating, concurrently with the recording of the image, the rear side of the material web with the transmitted light without illuminating the front side of the material web with the incident light; and,
recording the image without illuminating the front side of the material web with the incident light and without illuminating the rear side of the material web with the transmitted light.

19. The method of claim 18, further comprising:
illuminating the rear side of the material web concurrently with the front side of the material web.

20. The method of claim 18, wherein at least some parts of the material web are at least one of:
transparent for the incident light;
transparent for the transmitted light;
translucent for the incident light;
translucent for the transmitted light;
impermeable for the incident light;
impermeable for the transmitted light;
opaque for the incident light; and,
opaque for the transmitted light.

* * * * *